US 6,695,564 B2

(12) United States Patent
Pfisterer

(10) Patent No.: US 6,695,564 B2
(45) Date of Patent: Feb. 24, 2004

(54) TRAILER FOR GREENS MOWERS AND THE LIKE

(76) Inventor: James W. Pfisterer, 205 Country Day Rd., Chester, MD (US) 21619

( * ) Notice: Subject to any disclaimer, the term of this patent is extended or adjusted under 35 U.S.C. 154(b) by 0 days.

(21) Appl. No.: 10/077,996

(22) Filed: Feb. 20, 2002

(65) Prior Publication Data

US 2003/0156931 A1 Aug. 21, 2003

(51) Int. Cl.[7] ................................................ B60P 7/08
(52) U.S. Cl. ...................................... 414/485; 414/482
(58) Field of Search .............................. 414/482, 483, 414/485

(56) References Cited

U.S. PATENT DOCUMENTS

| 2,932,418 | A | * | 4/1960 | Ripley .......................... 214/505 |
| 3,780,894 | A | * | 12/1973 | Holmes et al. ............. 214/505 |
| 4,168,932 | A | * | 9/1979 | Clark ........................... 414/483 |
| 4,659,100 | A | * | 4/1987 | Welker ..................... 280/414.1 |
| 5,044,845 | A | * | 9/1991 | Baker .............................. 410/3 |
| 6,099,014 | A | * | 8/2000 | McLaughlin ............. 280/414.1 |
| 6,241,450 | B1 | * | 6/2001 | Gehman ..................... 414/480 |
| 6,382,891 | B1 | * | 5/2002 | Bellis .............................. 410/7 |
| 2002/0148870 | A1 | * | 10/2002 | Zimmerman ................ 224/492 |

* cited by examiner

Primary Examiner—Thomas J. Brahan
(74) Attorney, Agent, or Firm—Dennison, Schultz & Dougherty

(57) ABSTRACT

A self-loading cart for a greens mower including a wheel-supported mobile frame with a tilting bed pivotally mounted to the frame for movement between a rearwardly and downwardly inclined loading position and an upwardly pivoted substantially horizontal loaded position. As the bed moves to the loaded position, a locking tongue on the mobile platform projects through the bed and engages the loaded mower for a retention of the mower. Simultaneously, a latch automatically engages between a support beam of the bed and the mobile platform to lock the bed in the loaded position.

11 Claims, 4 Drawing Sheets

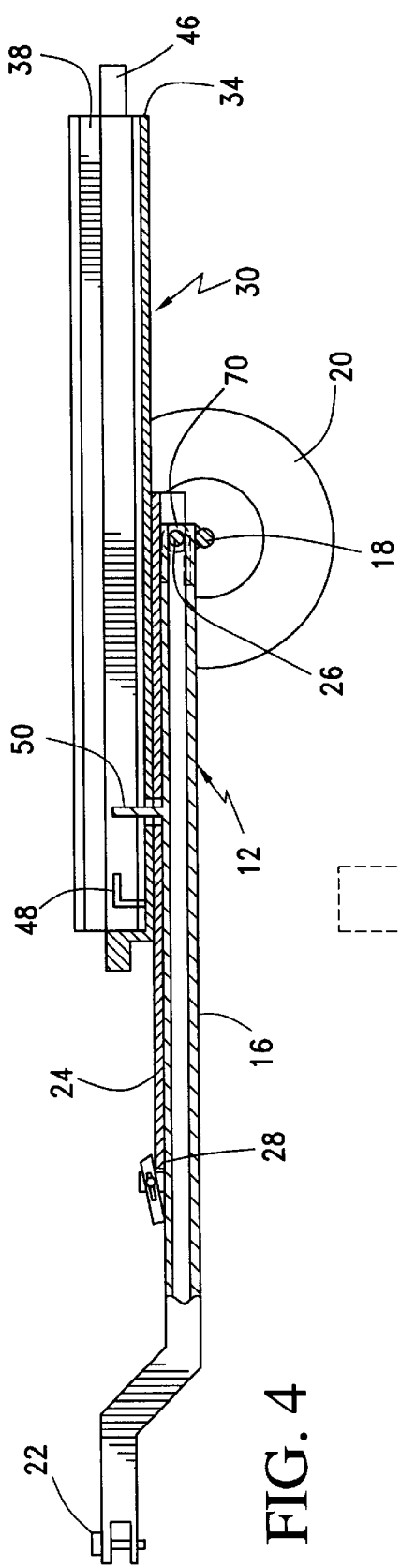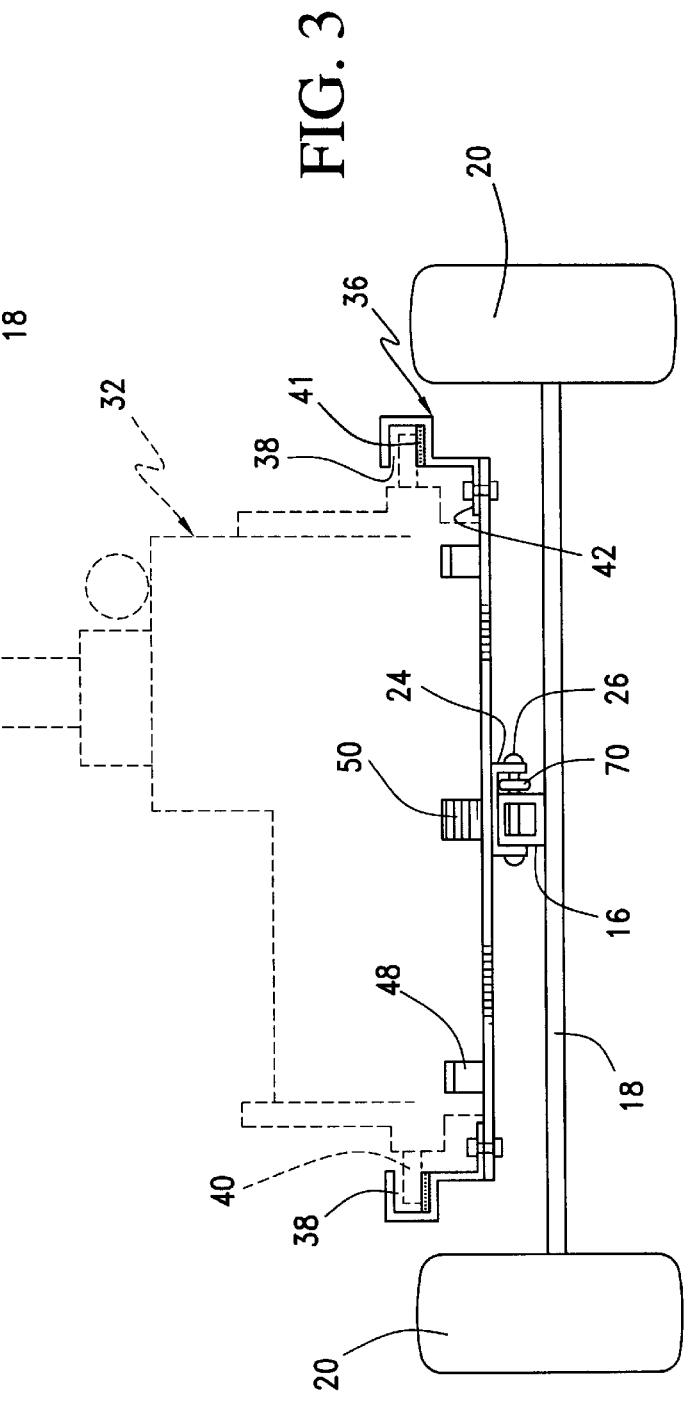

TRAILER FOR GREENS MOWERS AND THE LIKE

BACKGROUND OF THE INVENTION

A greens mower is a specialized piece of equipment utilized exclusively in maintaining the necessary close cutting and trimming of golf greens. As such, the mower has precision settings which must be maintained as the mower is moved from one green to another.

The transport of a mower between greens is normally provided for in either of two ways. In one case, the greens mower is typically provided with a pair of oppositely extending stub wheel shafts upon which a pair of removable transport wheels are mounted to allow for a direct driving of the mower across the fairways to the next green. This is rather slow in that the mower can only be moved at the actual speed of the mower itself. Also, the mower is necessarily rather roughly handled, resulting in a tendency to affect the precision settings desired. The mounting and removal of the transport wheels is also a rather time-consuming task.

As an alternative to a direct driving of the mower between the greens, it has also been proposed to utilize carts upon which the mower can be loaded and carried between the greens. However, the use of such carts in the past has also given rise to problems. More specifically, the loading of a mower on such a cart can be quite difficult, and frequently requires two persons to physically lift the mower onto the cart. As operation of the mower requires only a single person, the necessity for a second person merely to assist in loading and unloading the mower is clearly not a desirable feature. Also, while transport of the mower by a cart or trailer, as opposed to use of the mower's own transport wheels, is faster and more efficient, substantial problems with regard to maintaining the precision settings of the mower are still present in view of vibration and physical movement of the mower which normally freely sits on the trailer bed.

SUMMARY OF THE INVENTION

The present invention is directed to a mower cart or trailer, and has for its principal objects the provision of such a cart which enables the loading and unloading of a mower by one person with the loaded mower being automatically stabilized in position in a manner which minimizes vibration and movement during transport.

More particularly, the cart of the invention basically includes a wheeled frame with a tilting cart bed mounted on the frame for movement between a rearwardly inclined loading position and a forwardly pivoted, horizontal loaded position. In the loading position, the trailer is in fact self-loading in that the mower can be forwardly propelled directly onto the tilted bed. As the mower moves forward on the bed to its loaded position, the bed will, under the weight of the mower, pivot downwardly into its loaded position. As the bed assumes its loaded position, an upwardly extending locking tongue fixed to the frame is accommodated through a corresponding slot in the lowering bed and engages behind a component of the mower, for example the forward roller, to preclude rearward movement of the mower relative to the horizontal bed, thus locking the mower on the cart. At the same time, the bed or a support component thereon automatically locks to the wheeled frame to fix the bed in its loaded position.

During the loading of the mower on the tilted bed, movement of the mower is guided by the mower wheel shafts engaged in opposed guide rails or tracks which are cushioned and function not only to guide the loading mower, but also to cushion and stabilize the mower when loaded.

Other objects, feature and details of the invention will become apparent from the following more specific description of the invention.

BRIEF DESCRIPTION OF THE DRAWINGS

FIG. 3 is a rear view of the cart in its loaded position;

FIG. 4 is a cross-sectional view taken substantially on a plane passing along line 4—4 in FIG. 1;

DESCRIPTION OF PREFERRED EMBODIMENTS

Figure 1:
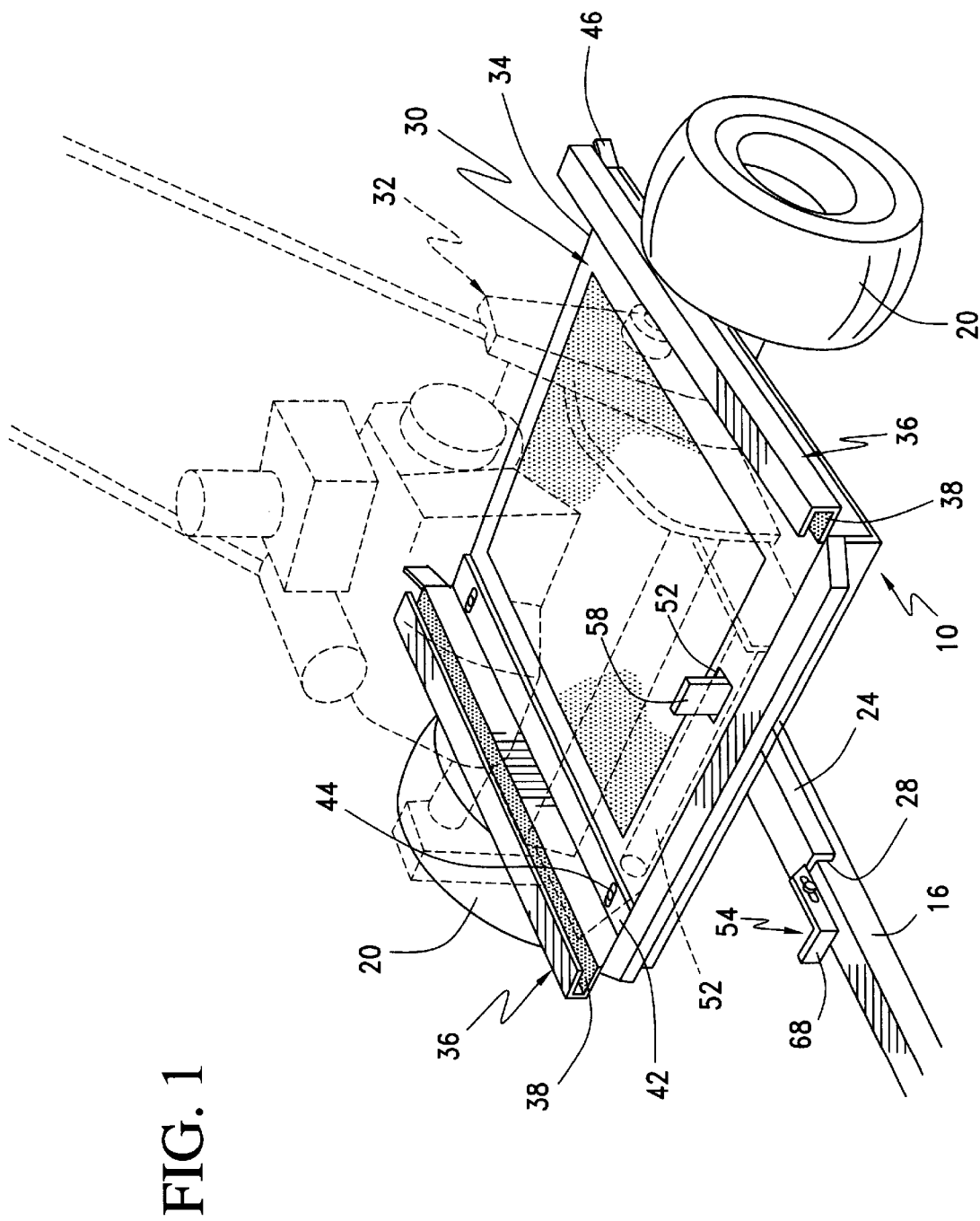
FIG. 1 is a perspective view of the loaded cart with the mower partially shown in phantom lines for purposes of illustration.
Figure 2:
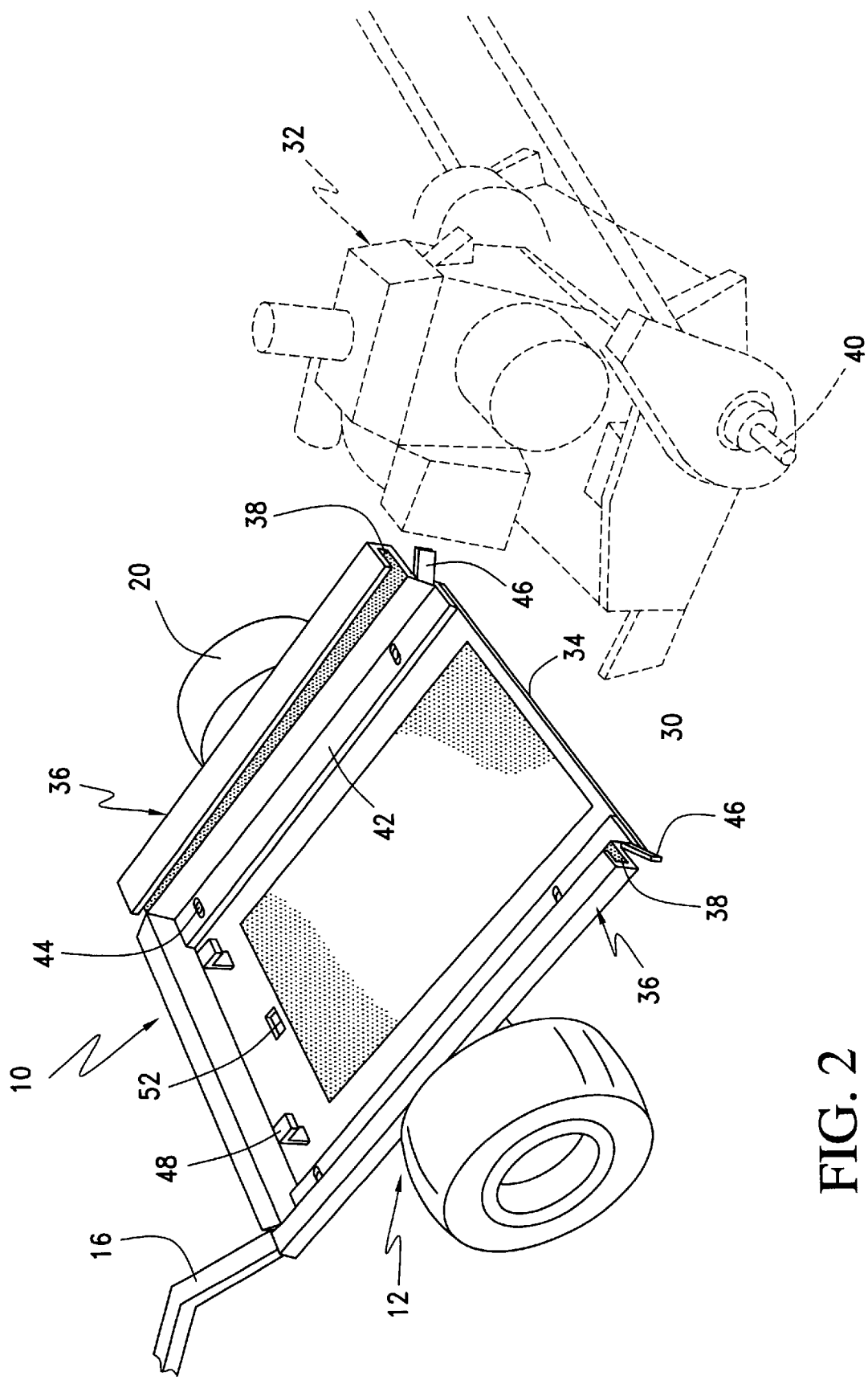
FIG. 2 is a perspective view of the cart with the bed tilted preparatory to loading and with the mower again partially shown for purposes of illustration.

Referring now more specifically to the drawings, the trailer or cart 10 principally comprises two cooperating assemblies, a mobile frame or platform 12 and a tilting bed assembly mounted thereto. The mobile platform 12, in the illustrated embodiment, basically comprises an elongate tow bar 16 having a following end mounted to and supported by a transverse axle 18, the opposite ends of which mount a pair of laterally spaced super cushioned wheels 20. The forward end of the tow bar 12, which, depending upon the particular towing vehicle, will have a clevis or other appropriate hitch assembly 22.

The tilting bed assembly 14 includes an elongate tilt beam 24. The tilt beam 24 has a rear end pivotally mounted, as at 26, to the following end of the tow bar 12, generally aligning over the transverse axle 18. The tilt beam 24, in the loaded position of the cart as shall be discussed in more detail subsequently, overlies and extends forwardly along the tow bar 12 to terminate in a forward end at an intermediate point along the tow bar 12.

The mower receiving bed 30 of the cart, which is of a width and length to accommodate the mower 32, is fixed to the tilt beam 24 and extends approximately equidistant forward and rearward of the pivot means 26 at the rear end of the beam 24. The forward end of the bed 30 is positioned rearward of the forward end 28 of the tilt beam 24. The rear or loading end 34 of the bed extends sufficiently rearward of the pivot means 26 and axle to, upon an upward tilting of the bed and tilt beam, engage the ground at a relatively low angle to allow for a direct driving of the mower onto the bed as shall be referred to subsequently.

In order to guide the mower 32 as it moves into position on the bed 30, the bed includes a pair of laterally spaced guide rails 36 comprising full length opposed laterally inwardly directed channels 38 upwardly offset from the floor of the bed 30 at a height and lateral spacing so as to receive the opposed projecting exposed wheel shafts 40 on the mower. These channels are lined with an appropriate durable elastomeric cushioning material 41 to protect the shafts 40 and, to a substantial degree, cushion and stabilize the mower in its loaded position. The guide rails 36, in order to accommodate particular mowers, are laterally adjustable on the bed deck. Pursuant thereto, each guide rail 36 includes a laterally directed base flange 42 which seats directly on the deck and includes two or more transversely elongate slots 44 therein which receive bolts engaged within appropriate bolt receiving holes in the deck, either screwing directly thereto or engaged with appropriate nuts underlying the deck. The guide rails, at the following or loading end of the cart bed 30, have rearwardly directed laterally flared extensions 46 for a guiding of the mower onto the bed. The upper surface or deck of the bed is also preferably provided with an appropriate non-slip surface, for example a rubber fabric mat bonded or otherwise affixed thereto.

The length of the cart bed 30 is such whereby as the mower 32, normally self-propelled, is moved upwardly onto the inclined bed and sufficiently forward of the divot means 26, the bed will pivot downwardly and engage the tilt beam 24 on the tow bar 16. When so positioned, the forward end of the mower 32 will normally be positioned against or closely adjacent a pair of upwardly projecting stops 48 positioned just rearward of the front wall of the trailer. In addition, and in response to the forward and downward pivoting of the bed to its loaded position, a locking tongue 50 will extend upward through and above the bed deck and engage the mower, preferably immediately behind the forward transverse drive roller 52 thereof whereby the mower is locked into position and precluded from any tendency to rearwardly move or accidentally discharge to the rear of the bed. This locking tongue 50 is rigid with and projects upwardly from the mobile frame or platform 12, more particularly the tow bar 16 in the illustrated embodiment, and aligns with a similarly configured slot 52 extending through the overlying tilt rail 24 and deck of the cart bed at a point rearward of the front wall 48. The height of the tongue 50 is such whereby the tongue is fully retracted from the slot 52 when the bed is in the tilted loading position thereof, and only engages through the slot as the tilting bed forwardly pivots to its loaded position, thus not interfering with either the loading or unloading of the mower, while at the same time providing for a positive retention of the loaded mower.

Figure 5:
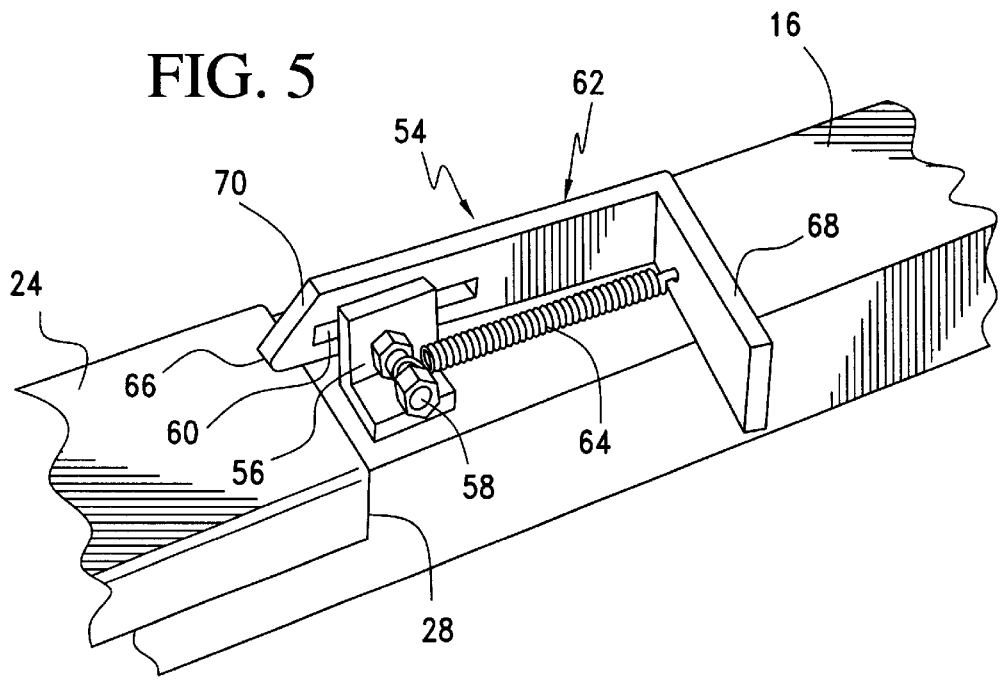
FIG. 5 is a perspective view of the latch mechanism locking the bed supporting tilt rail to the tow bar in the loaded position of the cart.

The present invention also specifically provides for a positive locking of the tilting bed assembly 14 to the mobile platform 12 in the fully loaded position. Pursuant thereto, and noting FIGS. 5 and 6 in particular, a spring loaded latch assembly 54 is mounted to the tow bar 16 immediately forward of the front end 28 of the tilt beam 24. This latch assembly includes a mounting block 56 welded to the tow bar and extending upward from the upper surface thereof. An elongate pivot pin 58 extends transversely through the mounting block 56 and projects to the opposite sides thereof. To one side of the block 56, the pivot pin 58 is rotatably and slidably received through an elongate slot 60 in a latch lever 62. To the opposite side of the mounting block 56, the pivot pin 58 mounts one end of an elongate coiled tension spring 64. The leading end portion 66 of the latch lever 62 overlies the leading end 28 of the tilt beam 24 in the loaded position so as to preclude an upward movement of this end away from the tow bar. The latch lever 62, remote from the forward end 66 thereof, is provided with a laterally directed handle portion 68 which generally parallels the pivot pin 58 and to which the opposite end of the tension spring 64 is connected whereby a constant forward pressure is applied to the handle 68 and latch lever 62 to retain the leading end portion 66 of the latch lever in retaining engagement over the tilt beam 24. It is intended that the latch lever automatically engage the tilt beam as the beam moves into overlying relation to the tow bar. Pursuant thereto, the leading end portion 66 of the latch lever is provided with a beveled upper surface 70 against which the forward end of the tilt beam engages, producing a forward camming action on the latch lever accommodated by the elongate slot 60 in the latch lever 62. This camming action is resiliently resisted by the spring 64 which, upon a passing of the forward end of the tilt beam below the latch lever, causes an immediate return of the leading end 66 to an overlying position relative to the tilt beam for a positive retention thereof. Inasmuch as the pivot pin 68 is slightly elevated relative to the upper surface of the tow bar 16, it will be recognized that the latch lever, at the handle end thereof, is slightly off-center below the pivot pin, thus retaining the latch lever in its locking position and avoiding any tendency for the latch lever to accidentally release.

Figure 6:
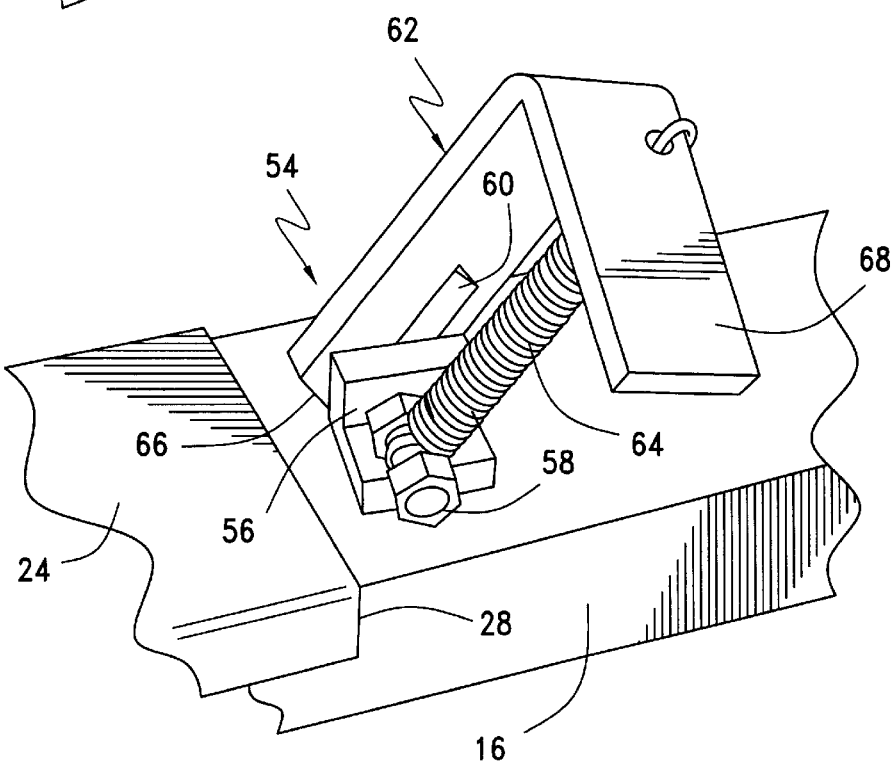
FIG. 6 is a perspective view of the released latch mechanism.

Noting FIG. 6 in particular, when the mower is to be unloaded, the latch lever 62 is manually grasped by the handle 68 and upwardly pivoted with the slightly rounded leading end portion 66 riding against the tilt beam and the latch lever thus being rearwardly retracted against the resilient bias of the spring 64 until the leading end portion 66 of the latch lever 62 is fully retracted from the forward end of the tilt beam 24, thus releasing the tilt beam and allowing for a rearward tilting of the tilt bed assembly.

Inasmuch as the tilt bed assembly has a tendency to remain in its loaded position due to the forward positioning of a major portion of the weight of the mower, the rearward tilting of the bed to allow for a rearward discharge of the mower will require a slight downward pressure on the loading end of the bed, such as by grasping and downwardly pushing the mower handle or by putting one's foot on the end of the bed and pressing downward. This results in a relative retraction of the locking tongue and allows for a rearward driving or otherwise moving of the mower from the bed. Further, in order to both stabilize the bed during the initial movement of the mower thereon, and assist in the physical rearward pivoting of the bed to unload the mower, an appropriate counterbalancing leaf spring 70 is engaged between the tilt bed assembly 14 and the mobile frame 12, biasing the bed to the inclined loading position. It will be appreciated that the biasing force of this spring 70, while sufficient to retain the unloaded bed in the loading position, does not interfere with the downward pivoting of the bed under the weight of the fully loaded mower.

The foregoing is considered illustrative of the principles of the invention. While a single embodiment has been set forth for purposes of illustration, other embodiments, within the scope of the invention, will also become apparent to those skilled in the art. For example, the cart bed can be laterally extended to accommodate multiple mowers, each stabilized by a separate set of guide rails and provided with separate mower retaining tongues. Similarly, the bed can be modified to accommodate a tandem arrangement of mowers. Also, as required by the weight and or number of mowers to be accommodated, additional structural framing can be incorporated into both the mobile platform and the tilt bed assembly.

What is claimed is:

1. A cart for ground care equipment comprising a mobile frame having leading and following ends, an axle transversely of and supporting said frame, ground engaging wheels mounted on said axle and laterally spaced to each side thereof, a tilting bed overlying said mobile frame and extending both forwardly and rearwardly of the following end of said frame, pivot means mounting said bed to said frame for a selective pivotal movement of said bed between a rearwardly and downwardly inclined loading position relative to said frame for the loading of equipment thereon, and a loaded position overlying and directly supported on said frame, said bed extending forwardly of said pivot means for accommodation of at least a major portion of the weight of loaded equipment forward of said pivot means sufficient to produce a downward pivoting movement of said bed to overlying engagement with said frame, means for automatically locking said bed to said frame upon movement to the loaded position, and means for retaining loaded equipment on said bed comprising a slot defined through said bed forward of said pivot means, and a retaining tongue fixed to said mobile frame and extending vertically therefrom in alignment with and receivable upward through said slot upon movement of said bed to said loaded position for retaining engagement with equipment loaded on said bed whereby rearward movement of the equipment is precluded, said bed slot being upwardly withdrawn from said retaining tongue as said bed moves from said loaded position to said loading position.

2. The cart of claim 1 including laterally spaced guide rails on said bed and extending forwardly from the following end thereof for receiving opposed portions of equipment to be loaded on said bed and for guiding of the equipment during forward movement thereof on said bed.

3. The cart of claim 2, including means for laterally adjusting said guide rails on said bed for the accommodation of equipment of various widths.

4. The cart of claim 2, including an elongate tilt beam directly underlying and supporting said cart bed, said mobile frame comprising an elongate tow bar extending forwardly of said cart bed for selective engagement with a towing vehicle, said pivot means pivotally engaging said tilt beam with said tow bar.

5. A cart for ground care equipment comprising a mobile frame including an elongate tow bar having a leading end with hitch means thereon, said frame having a following end, an axle mounted transversely of and supporting said frame, ground engaging wheels mounted on said axle, a tilt beam overlying said tow bar and extending forward from said following end of said frame to a forward end at an intermediate point along said tow bar, means mounting said tilt beam to said frame for selective upward pivoting of said beam about said following end of said frame, a cart bed fixed to said tilt beam for pivotal movement therewith between a generally horizontal loaded position with said tilt beam overlying and engaged on said tow bar, and a loading position wherein said tilt beam and said bed are rearwardly inclined, said bed extending rearward of said following end of said mobile frame and terminating in a rear loading end sufficiently rearward of said axle to allow for forward rolling of equipment directly onto said bed in the loading position of said bed, said bed extending forwardly of said means mounting said tilt beam to said frame to allow for forward movement of loaded equipment on said bed sufficient to produce a downward pivotal movement of said bed and said tilt beam to the loaded position, and means for automatically locking said tilt beam to said tow bar upon movement of said tilt beam to said loaded position, and means for retaining loaded equipment on said bed comprises slot means defined through said bed, and a retaining tongue fixed to said tow bar and extending vertically therefrom in alignment with an receivable upward through said slot means in said loaded position of said bed for retaining engagement with equipment loaded on said bed to preclude rearward unloading of such equipment, said slot means being upwardly withdrawn from said retaining tongue as said bed.

6. The cart of claim 5 including laterally spaced guide rails on said bed and extending forwardly from the rear loading end thereof for receiving opposed portions of equipment to be loaded on said bed and for guiding of the equipment during forward movement thereof on said bed.

7. The cart of claim 6 including means for laterally adjusting said guide rails on said bed for the accommodation of equipment of various widths.

8. The cart of claim 7 wherein said means mounting said latch lever includes a spring biasing said lever into said locked position, said latch lever having a camming surface thereon aligned with and engaged by the forward end of said tilt beam as said tilt beam pivots to the loaded position for a camming retraction of said latch lever and a spring biased return of said latch lever as the forward end of the tilt beam moves therebelow and into engagement with the tow bar.

9. The cart of claim 8 wherein said means mounting said latch lever further includes a mounting block fixed to said row bar forward of said tilt beam forward end, a pivot pin supported by said block transversely across said tow bar in upwardly spaced relation thereto, said latch lever having an elongate slot therein receiving said pivot pin therethrough for both sliding and pivotal movement of said latch lever on said pin, and handle means on said latch lever for a manual pivotal manipulation of said latch lever and a selective manual withdrawing of said latch lever from engagement with said tilt beam forward end.

10. The cart of claim 6 wherein said means locking said tilt beam to said tow bar comprises a latch lever, means mounting said lever on said tow bar immediately forward of the forward end of said tilt beam for selective movement of said lever between a locked position engaged over and retaining said forward end and a released position forwardly withdrawn from said forward end of said tilt beam.

11. The cart of claim 6 including spring means pivotally biasing said tilt beam and cart bed to the inclined loading position thereof.

\* \* \* \* \*